(12) United States Patent
Mok et al.

(10) Patent No.: US 8,279,708 B2
(45) Date of Patent: Oct. 2, 2012

(54) MEASUREMENT METHOD FOR A GRANULAR COMPACTION PILE USING CROSSHOLE SEISMIC TESTING

(75) Inventors: Young Jin Mok, Gyeonggi-do (KR); Hak Sung Kim, Seoul (KR); In Beom Park, Seoul (KR); Chul Soo Park, Gyeonggi-do (KR)

(73) Assignee: Industry Academic Cooperation Foundation of Kyunghee University, Yongin-si Gyeonggi-do (KR)

( * ) Notice: Subject to any disclaimer, the term of this patent is extended or adjusted under 35 U.S.C. 154(b) by 394 days.

(21) Appl. No.: 12/721,690

(22) Filed: Mar. 11, 2010

(65) Prior Publication Data

US 2011/0007605 A1 Jan. 13, 2011

(30) Foreign Application Priority Data

Jul. 7, 2009 (KR) ........................ 10-2009-0061686

(51) Int. Cl.
 *G01V 1/00* (2006.01)
 *E21B 43/00* (2006.01)
(52) U.S. Cl. ............ 367/75; 367/37; 166/245; 166/285; 175/50; 181/105; 181/112
(58) Field of Classification Search .................... 367/75; 181/102, 105, 108, 112; 166/245, 256, 285; 175/50
See application file for complete search history.

(56) References Cited

U.S. PATENT DOCUMENTS

| 4,397,588 A | * | 8/1983 | Goughnour | ............... 405/236 |
| 2003/0131993 A1 | * | 7/2003 | Zhang et al. | ............. 166/256 |
| 2005/0051327 A1 | * | 3/2005 | Vinegar et al. | ............. 166/256 |
| 2006/0213657 A1 | * | 9/2006 | Berchenko et al. | ......... 166/245 |
| 2009/0219784 A1 | * | 9/2009 | Hayes | ........................ 367/35 |

FOREIGN PATENT DOCUMENTS

KR 100763955 B1 9/2007

OTHER PUBLICATIONS

Notice of Allowance for Korean Patent Application No. 10-2009-0061686 dated Apr. 28, 2011.

* cited by examiner

*Primary Examiner* — Isam Alsomiri
*Assistant Examiner* — James Hulka
(74) *Attorney, Agent, or Firm* — RatnerPrestia

(57) ABSTRACT

A measurement method for a granular compaction pile 10 using a crosshole seismic test. The measurement method includes forming first to fifth measurement holes around the granular compaction pile, injecting grouting material into the first to fifth measurement holes and inserting casings into the first to fifth measurement holes, respectively, and installing an oscillator and a detector of a crosshole seismic tester in the first to fifth holes and detecting a velocity of a shearing wave, thereby measuring a diameter of the granular compaction pile according to a construction depth thereof. The shape and the diameter of the granular compaction pile are easily checked without causing damage to the granular compaction pile.

4 Claims, 7 Drawing Sheets

MEASUREMENT METHOD FOR A GRANULAR COMPACTION PILE USING CROSSHOLE SEISMIC TESTING

BACKGROUND OF THE INVENTION

1. Field of the Invention

The present invention relates to a measurement method for a granular compaction pile using a crosshole seismic test. More particularly, the present invention relates to a measurement method for a granular compaction pile using a crosshole seismic test, capable of measuring a diameter of the granular compaction pile, which is constructed in a soft ground as a foundation, according to the construction depth thereof through an S-wave measurement.

2. Description of the Prior Art

In a soft clay layer, a stone column serves as a base foundation to support an underground and to prevent the circular sliding failure and lateral guidance of an abutment for the purpose of accelerating consolidation of the foundation ground and the ground improvement.

In Korea, a sand compaction pile (SCP) method employing sand as compaction material has been extensively used in the past. However, due to the lack of sand and the price advance of the sand, a granular compaction pile (GCP) method, which employs a low-price aggregate, has been increasingly used in the construction to improve the ground.

In general, according to the construction using the GCP method, a casing having an inner diameter of 400 mm and equipped with a conic shoe is inserted into the ground by a desired depth and a dose of crushed stone (diameter 400 mm and height 3 m) is input into the casing. In this state, the casing is drawn by 3 m and then the casing is reinserted into the ground by 2 m to perform compaction work. This compaction work is carried out until the crushed stone having the diameter of 400 mm have the desired diameter of 700 mm. This compaction work repeats in the unit of 1 mm until the granular compaction pile work can be completed up to the ground surface.

The integrity evaluation of the granular pile is assumed based on the dose of the crushed stone input into the casing and the insertion depth of the casing. However, this type of integrity evaluation may not ensure the continuous structure having the constant diameter and difficulty remains in finding defects in the pile.

In addition, the ground around the granular pile is excavated to check the granular pile with the naked eyes, or a core is sampled from the granular pile by boring the granular pile to check the desired diameter of the granular pile.

However, the above methods may not find diameter variation of the granular pile in detail and may cause damage to the granular pile.

SUMMARY OF THE INVENTION

Accordingly, the present invention has been made to solve the above-mentioned problems occurring in the prior art, and the present invention provides a measurement method for a granular compaction pile using a crosshole seismic test, capable of easily measuring a diameter of the granular compaction pile, which is constructed in a soft ground as a foundation, according to the construction depth thereof through an S-wave measurement.

In order to accomplish the above object, the present invention provides a measurement method for a granular compaction pile using a crosshole seismic test, the measurement method comprising the steps of: a) forming first to fifth measurement holes around the granular compaction pile constructed in a soft ground in such a manner that the first and second measurement holes are aligned at both sides of the granular compaction pile in an x-axis direction of the granular compaction pile, the third measurement hole is aligned in line with an extension line between the first and second measurement holes while being remote from the second measurement hole, and the fourth and fifth measurement holes are aligned at both sides of the granular compaction pile in a y-axis direction of the granular compaction pile in perpendicular to the extension line between the first and second measurement holes; b) injecting grouting material into the first to fifth measurement holes and inserting casings into the first to fifth measurement holes, respectively; and c) installing an oscillator and a detector of a crosshole seismic tester in the first and second measurement holes, second and third measurement holes, and fourth and fifth measurement holes, respectively, and detecting a velocity of a shearing wave passing through a medium among the first to fifth measurement holes, thereby measuring a diameter of the granular compaction pile according to a construction depth thereof.

According to the present invention, the first and second measurement holes are formed in the ground surface remote from the granular compaction pile by 10 to 15 cm.

According to the present invention, the fourth and fifth measurement holes have depth of about 1 m from a ground surface.

According to the present invention, the shape and the diameter of the granular compaction pile can be easily found according to the construction depth of the granular compaction pile based on the velocity of the shearing wave measured from each measurement hole without causing damage to the granular compaction pile.

BRIEF DESCRIPTION OF THE DRAWINGS

The above and other objects, features and advantages of the present invention will become more apparent from the following detailed description taken in conjunction with the accompanying drawings, in which.

DETAILED DESCRIPTION OF THE EXEMPLARY EMBODIMENTS

Hereinafter, an exemplary embodiment of the present invention will be described with reference to the accompanying drawings.

Figure 1:
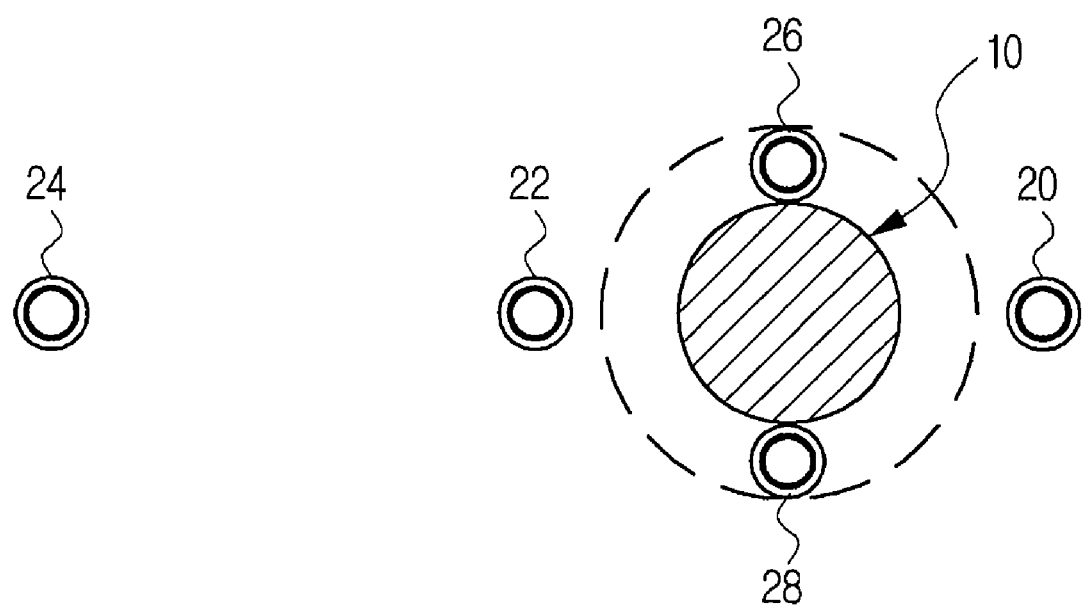
FIG. 1 is a plan view showing a measurement method for a granular compaction pile using a crosshole seismic test according to the present invention.
Figure 2:
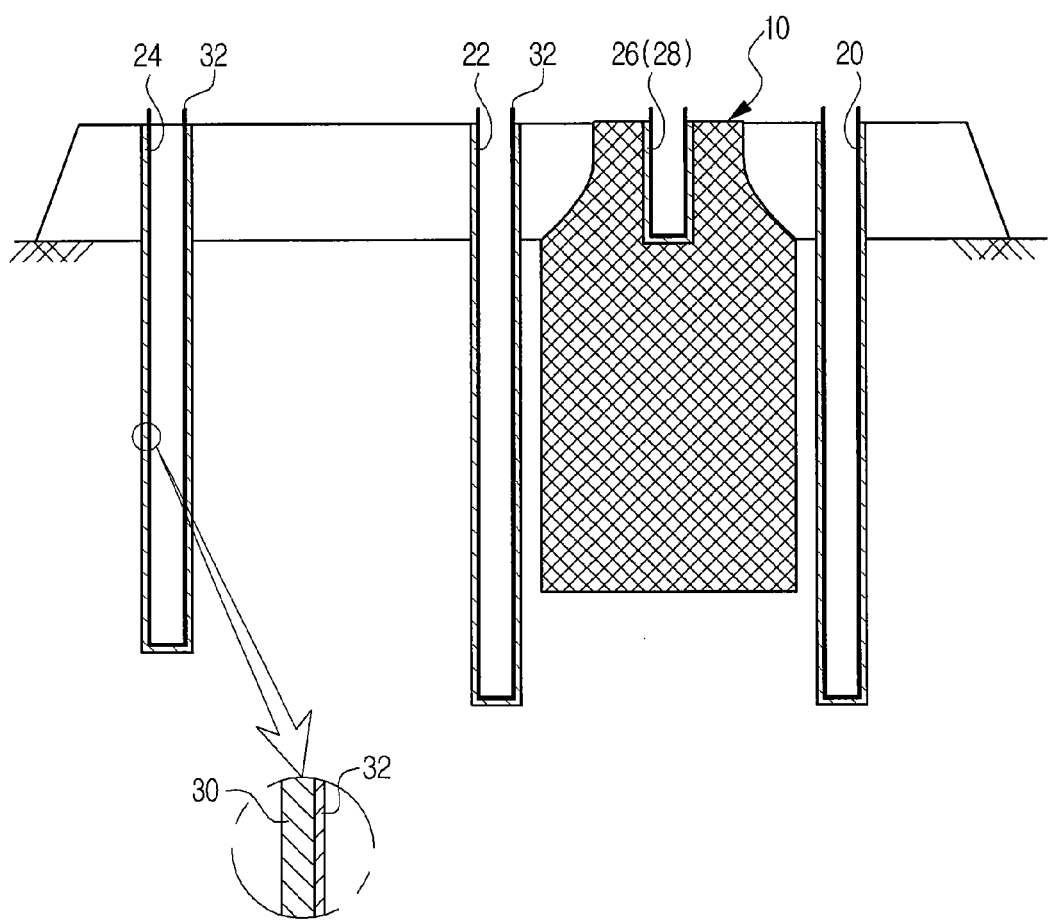
FIG. 2 is a sectional view showing the measurement method for the granular compaction pile using the crosshole seismic test of FIG. 1.
Figure 3A:
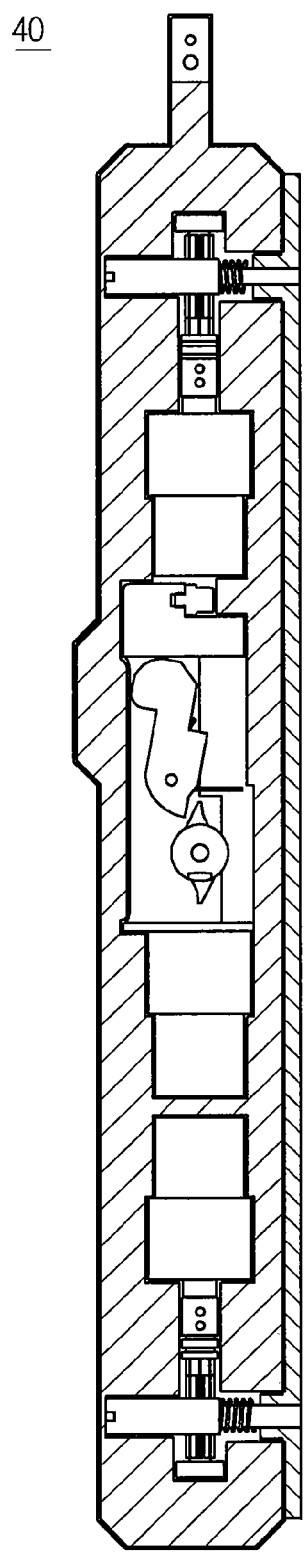
FIGS. 3A and 3B are sectional views showing an oscillator and a detector used in the crosshole seismic test for the granular compaction pile according to the present invention.

FIG. 1 is a plan view showing a measurement method for a granular compaction pile using a crosshole seismic test according to the present invention, FIG. 2 is a sectional view showing the measurement method for the granular compaction pile using the crosshole seismic test of FIG. 1, and FIGS. 3A and 3A are sectional views showing an oscillator and a detector used in the crosshole seismic test for the granular compaction pile according to the present invention.

As shown in FIGS. 1 and 2, the measurement method for the granular compaction pile using the crosshole seismic test according to the present invention includes the steps of a) forming first to fifth measurement holes 20, 22, 24, 26 and 26 around a granular compaction pile 10 constructed in a soft ground in such a manner that the first and second measurement holes 20 and 22 are aligned in a ground surface at both sides of the granular compaction pile 10 in an x-axis direction of the granular compaction pile 10, the third measurement hole 24 is aligned in line with an extension line between the first and second measurement holes 20 and 22 while being remote from the second measurement hole 22, and the fourth and fifth measurement holes 26 and 28 are aligned at both sides of the granular compaction pile 10 in a y-axis direction of the granular compaction pile 10 in perpendicular to the extension line between the first and second measurement holes 20 and 22; b) injecting grouting material 30 into the first to fifth measurement holes 20, 22, 24, 26 and 28 and inserting casings 32 into the first to fifth measurement holes 20, 22, 24, 26 and 28, respectively; and c) installing an oscillator 40 and a detector 50 of a crosshole seismic tester in the first and second measurement holes 20 and 22, second and third measurement holes 22 and 24, and fourth and fifth measurement holes 26 and 28, respectively, and detecting a velocity of a shearing wave passing through a medium among the first to fifth measurement holes 20, 22, 24, 26 and 28, thereby measuring a diameter of the granular compaction pile 10 according to a construction depth thereof.

In more detail, a casing having an inner diameter of 400 mm and equipped with a conic shoe is inserted into the ground by a desired depth and a dose of crushed stone (diameter 400 mm and height 6 m) is input into the casing. In this state, the casing is drawn by 6 m and then the casing is reinserted into the ground by 5 m to perform compaction work. This compaction work is carried out until the crushed stone having the diameter of 400 mm have the desired diameter of 700 mm. This compaction work repeats in the unit of 1 m until the granular compaction pile work can be completed up to the ground surface. After that, landfill cover soil is casted on the ground surface to the desired height, thereby completing the construction work.

In order to measure the granular compaction pile 10 constructed in the soft ground as a foundation, the first and second measurement holes 20 and 22 are formed in the ground surface at both sides of the granular compaction pile 10 in the x-axis direction of the granular compaction pile 10, respectively.

At this time, the first and second measurement holes 20 and 22 are formed in the ground surface by using a drilling machine (not shown) equipped with a steel casing, the grouting material 30 is injected into the steel casing, and then the PVC casing 32 is installed in the steel casing. After that, the steel casing is removed, thereby completing the formation of the first and second measurement holes 20 and 22. The first and second measurement holes 20 and 22 may have depth slightly greater than depth of the granular compaction pile 20 measured from the ground surface of the landfill cover soil.

In order to prevent collapse of the borehole wall, the grouting material 30 includes cement paste mixed with bentonite and expansion agent.

For instance, the grouting material 30 includes 40 kg of cement, 40 L of water, 10 kg of bentonite and 0.7 kg of expansion agent.

In addition, the first and second measurement holes 20 and 22 are formed in the ground surface remote from the granular compaction pile 10 by 10 to 15 cm.

That is, since the shape of the granular compaction pile 10 in the ground is unknown, the first and second measurement holes 20 and 22 are formed in the ground surface while being spaced apart from the granular compaction pile 10 by a predetermined distance, thereby preventing the granular compaction pile 10 from being damaged and avoiding imprecise diameter measurement for the granular compaction pile 10.

However, if the first and second measurement holes 20 22 are formed too far from the granular compaction pile 10, the velocity of the seismic wave measured through the crosshole seismic test is mainly affected by the surrounding soft ground layer other than the crushed stone subject to the test.

That is, the seismic wave is refracted when passing through a medium. Thus, if the first and second measurement holes 20 and 22 are formed too far from the granular compaction pile 10, the seismic wave detours the granular compaction pile 10, so the precise measurement result may not be achieved. For this reason, the first and second measurement holes 20 and 22 are slightly remote from the granular compaction pile 10 by a predetermined distance.

Preferably, the first and second measurement holes 20 and 22 are formed in the ground surface while being remote from the granular compaction pile 10 by 10 to 15 cm. More preferably, the first and second measurement holes 20 and 22 are formed in the ground surface while being remote from the granular compaction pile 10 by 12 to 13 cm.

After the first and second measurement holes 20 and 22 have been formed, the third measurement hole 24 is formed in the ground surface in line with an extension line between the first and second measurement holes 20 and 22 while being remote from the second measurement hole 22 by a predetermine distance. For instance, the third measurement hole 24 is remote from the second measurement hole 22 by abut 1 m. The third measurement hole 24 is for measuring the velocity of the seismic wave of the soft ground layer.

The perforation procedure for the third measurement hole 24 is similar to that of the first and second measurement holes 20 and 22 and the third measurement hole 24 has depth similar to that of the first and second measurement holes 20 and 22.

After the third measurement hole 24 has been formed, the fourth and fifth measurement holes 26 and 28 are formed in the ground surface at both sides of the granular compaction pile 10 in the y-axis direction of the granular compaction pile 10 such that the fourth and fifth measurement holes 26 and 28 are closely adjacent to the granular compaction pile 10.

Different from the first and second measurement holes 20 and 22, the fourth and fifth measurement holes 26 and 28 are closely adjacent to the granular compaction pile 10 in order to measure the velocity of the seismic wave only for the granular material to calculate the diameter of the granular compaction pile 10.

In addition, the fourth and fifth measurement holes 26 and 28 have depth of about 1 m from the ground surface of the landfill cover soil.

The fourth and fifth measurement holes 26 and 28 are for measuring the velocity of the shearing wave ($V_{cs}$) only for the granular compaction pile 10. By using the shearing wave velocity for the granular compaction pile 10, which is measured at the depth of 1 m from the ground surface of the landfill cover soil, the increment of the shearing wave velocity for the granular compaction pile 10 according to the increment of the restraint stress can be obtained based on following Equation 1. Therefore, the shearing wave velocity for the granular compaction pile 10 beyond the depth of 1 m can be assumed according to Equation 1.

$$V_{s,cs} = V_{s,measured}\left(\frac{\overline{\sigma}_{m,cs}}{\overline{\sigma}_{m,measured}}\right)^{n_G} \qquad \text{Equation 1}$$

Figure 3B:
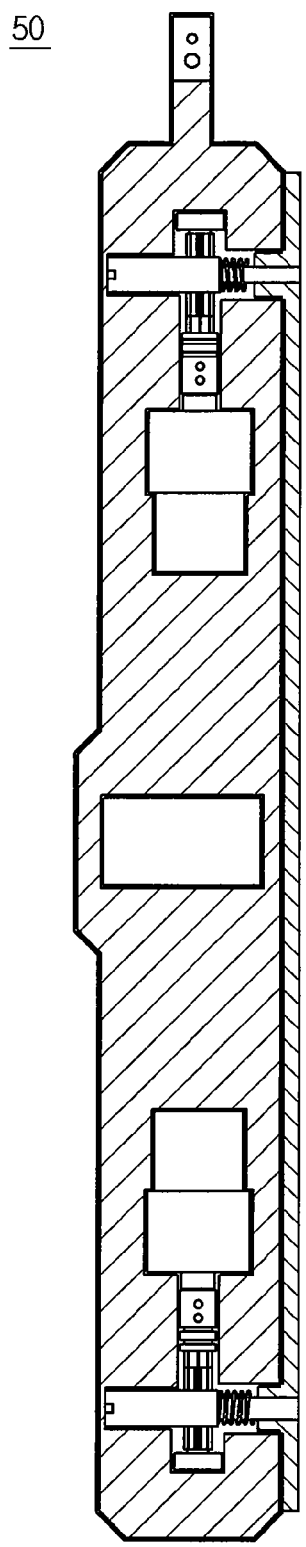

$\overline{\sigma}_{m,measured}$: mean effective restraint stress in measured depth $\overline{\sigma}_{m,cs}$: mean effective restraint stress in target depth $V_{s,measured}$: S-wave velocity measured in depth corresponding to restraint stress $\overline{\sigma}_{m,measured}$ $V_{s,cs}$: expected S-wave velocity in depth corresponding to restraint stress $\overline{\sigma}_{m,cs}$ $n_G$: restraint stress non-dimensional influence coefficient Meanwhile, in order to perform the seismic wave test for measuring the granular compaction pile 10 according to the present invention, a seismic wave tester equipped with an oscillator 40 and a detector 50 shown in FIGS. 3A and 3B are prepared.

The seismic wave tester employed in the present invention is disclosed in Korean Patent Registration No. 0767595 (In-hole seismic testing device for measuring dynamic stiffness of subsurface materials), which is issued to applicant of the present invention, so detailed description thereof will be omitted.

The oscillator 40 and the detector 50 of the seismic wave tester are inserted into the first and second measurement holes 20 and 22, the second and third measurement holes 22 and 24, and the fourth and fifth measurement holes 26 and 28, respectively, thereby detecting the velocity of the shearing wave passing through the medium among the first to fifth measurement holes 20, 22, 24, 26 and 28.

In other words, the diameter of the granular compaction pile 10 is checked through the first and second measurement holes 20 and 22. At this time, the measured shearing wave may include both shearing wave ($V_{cs}$) passing through the granular compaction pile 10 and shearing wave ($V_s$) passing through the surrounding ground between the granular compaction pile 10 and the first and second measurement holes 20 and 22.

In addition, the shearing wave ($V_s$) passing through the surrounding ground is measured through the second and third measurement holes 22 and 24. That is, the velocity of the shearing wave passing through the surrounding ground via the second and third measurement holes 22 and 24 is measured.

Further, the shearing wave ($V_{cs}$) only for the granular compaction pile 10 is measured through the fourth and fifth measurement holes 26 and 28. At this time, the velocity of the shearing wave ($V_{cs}$) according to the depth of the granular compaction pile 10 can be assumed by applying the shearing wave ($V_{cs}$) measured through the fourth and fifth measurement holes 26 and 28 to Equation 1.

When the measurement is carried out through the first to fifth measurement holes 20, 22, 24, 26 and 28, the S-wave must be used because the soft ground where the granular compaction pile 10 is constructed may contain underground water. The shearing wave measured below the underground water includes the P-wave and the S-wave. In general, the velocity of the P-wave passing through the water is faster than the velocity of the P-wave passing through the granular compaction pile 10, so the P-wave is unsuitable for measuring the diameter of the granular compaction pile 10. If the S-wave (SH-wave) is used for the measurement, the start of the S-wave can be recognized by overlapping S-waves after generating the S-waves in opposite directions. Therefore, when the seismic wave test is performed in the soft ground containing the underground water, the use of the S-wave is absolutely required.

Then, the crosshole test is performed in the first and second measurement holes 20 and 22, second and third measurement holes 22 and 24, and fourth and fifth measurement holes 26 and 28 by using the seismic wave tester, thereby measuring the velocity of the shearing wave to obtain the profile of the shearing wave velocity and the shearing wave travel time. At this time, it is assumed that the velocity of the shearing wave passing through the original ground around the granular compaction pile 10 of the first and second measurement holes 20 and 22 is equal to the velocity of the shearing wave passing through the original ground around the granular compaction pile 10 of the second and third measurement holes 22 and 24.

After that, velocity information of the shearing wave according to the depth of the first and second measurement holes 20 and 22, the second and third measurement holes 22 and 24, and the fourth and fifth measurement holes 26 and 28 is applied to below Equations 4 to 7, thereby measuring and evaluating the diameter of the granular compaction pile 100 according to the depth z thereof.

$$L_{total}(z) = L_{crushed\ stone}(z) + L_{soft\ clay}(z) \qquad \text{Equation 4}$$

$$t_{total}(z) = t_{crushed\ stone}(z) + t_{softclay}(z) = \frac{L_{crushed\ stone}}{V_{crushed\ stone}} + \frac{L_{soft\ clay}}{V_{soft\ clay}} \qquad \text{Equation 5}$$

$$t_{total}(z) = \frac{L_{crushed\ stone}}{V_{crushed\ stone}} + \frac{L_{total} - L_{crushed\ stone}}{V_{soft\ clay}} \qquad \text{Equation 6}$$

$$L_{crushed\ stone}(z) = \left(\frac{L_{total} - V_{soft\ clay} \cdot t_{total}}{V_{crushed\ stone} - V_{soft\ clay}}\right) V_{crushed\ stone} \qquad \text{Equation 7}$$

$L_{total}(z)$: total length according to depth (z) of first and measurement holes (this length is constantly set to 0.978 m in the present invention regardless of the depth)

$L_{crushed\ stone}(z)$: diameter of granular compaction pile according t depth (z)

$L_{softclay}(z)$: distance of original ground according to depth (z) of first and measurement holes $t_{total}(z)$: travel time of S-wave transferred through first and measurement holes according to depth (z)

$t_{crushed\ stone}(z)$: travel time of S-wave transferred through granular compaction pile according to depth (z)

$t_{softclay}(z)$: travel time of S-wave transferred through original ground according to depth (z)

$V_{crushed\ stone}$: S-wave velocity passing through crushed stone according to depth (z)

$V_{softclay}$: S-wave velocity passing through soft original ground according to depth (z)

Note: L[m], t[sec], and V[m/sec]

Figure 4:
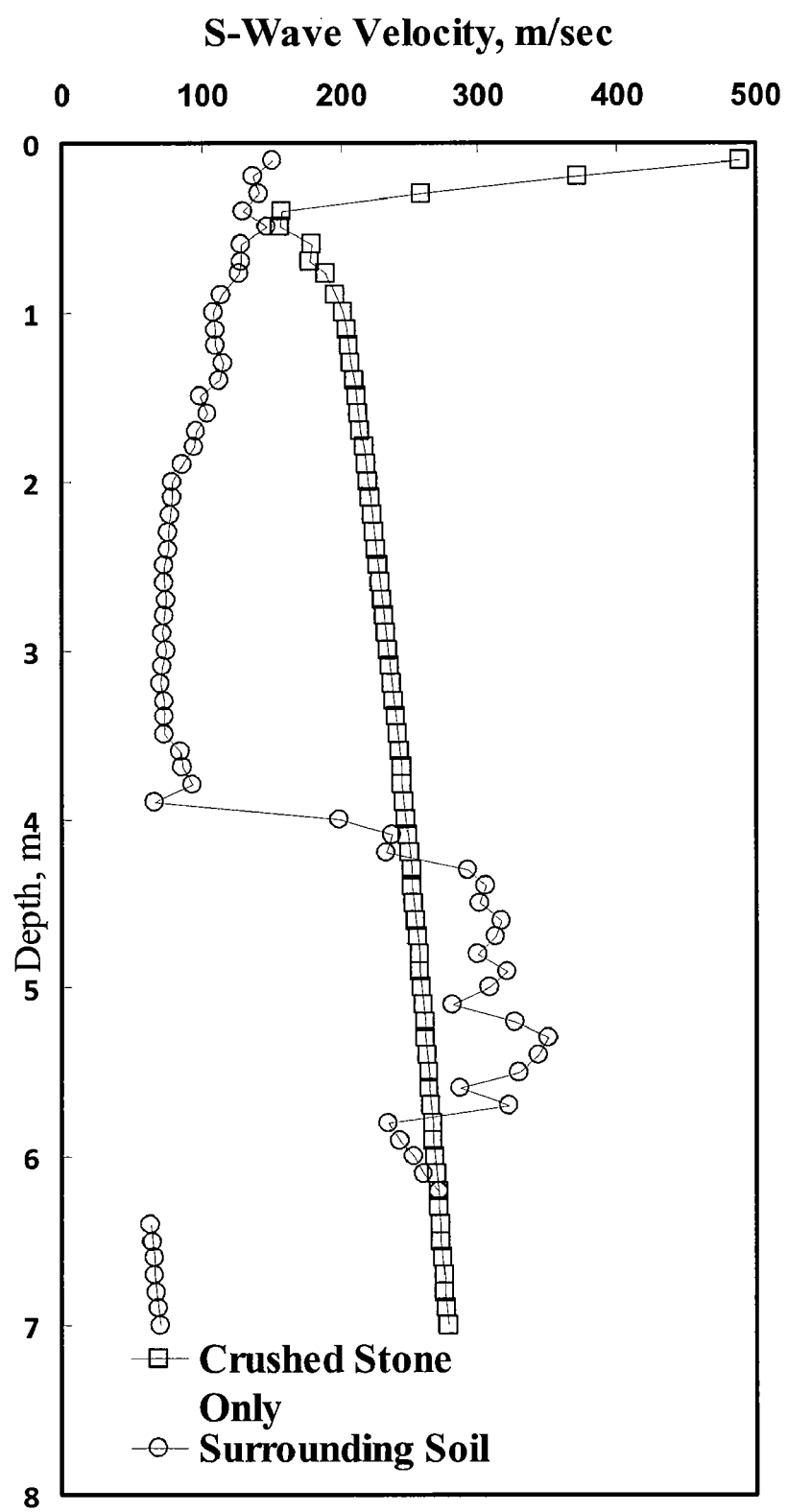
FIGS. 4 to 6 are graphs showing the measurement result of the crosshole seismic test for the granular compaction pile obtained in the field according to the present invention.
Figure 5:
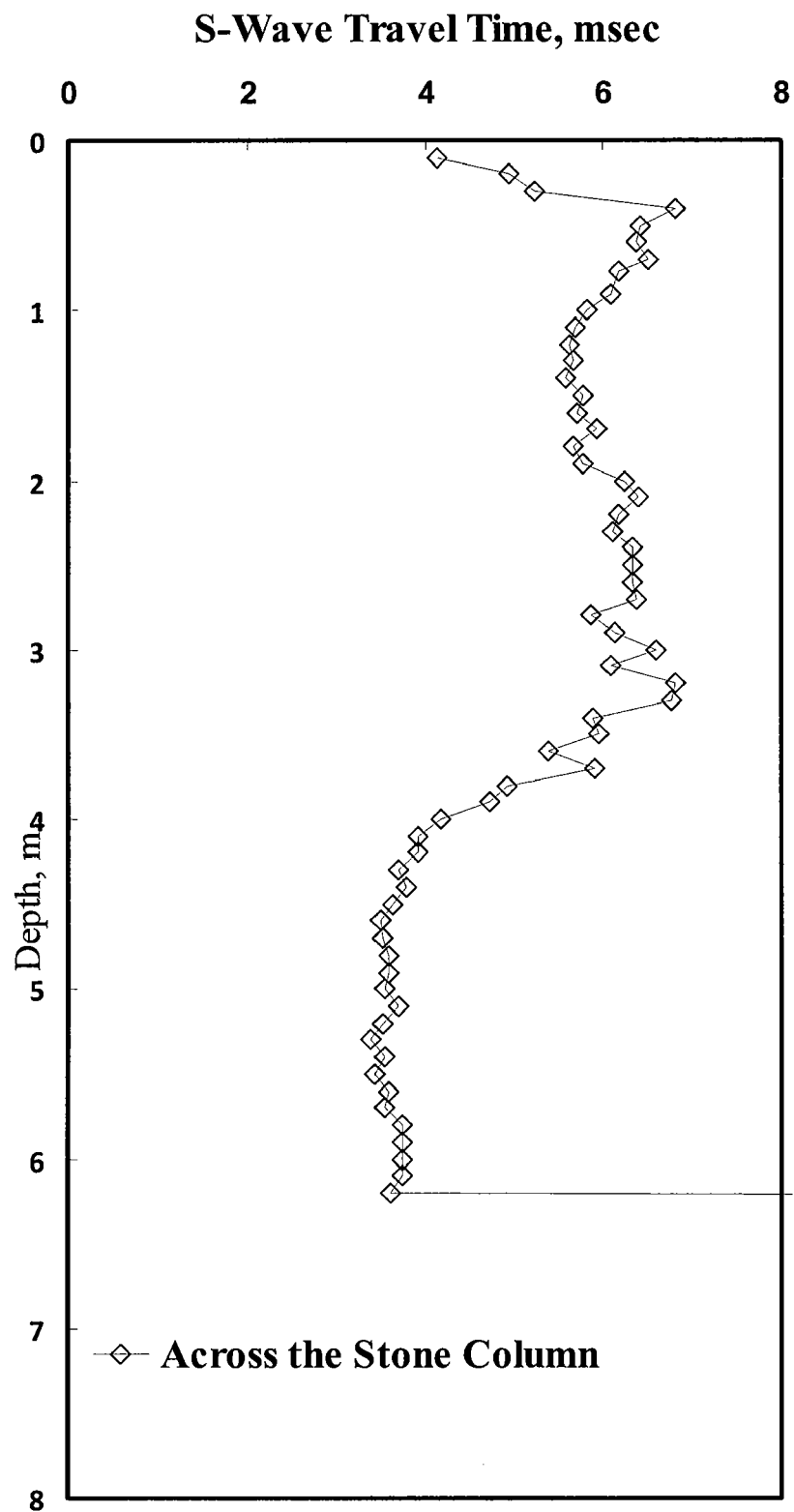
Figure 6:
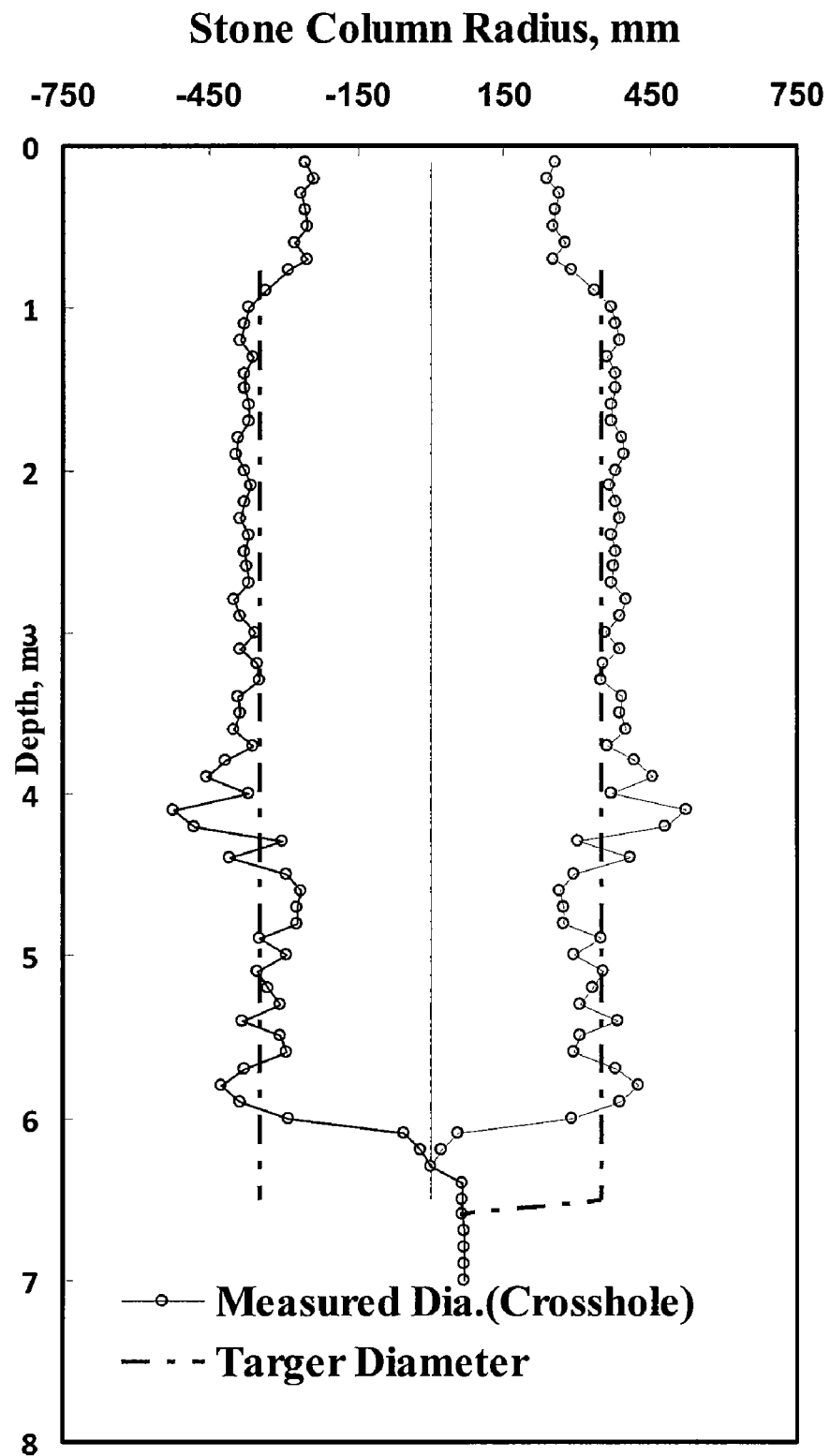

FIGS. 4 to 6 are graphs showing the measurement result of the crosshole seismic test for the granular compaction pile obtained in the field according to the present invention.

In order to measure the granular compaction pile 10 according to the present invention, the granular compaction pile 10 having the diameter of 700 mm is constructed in the soft ground. However, for the purpose of operation of construction equipment, the granular compaction pile 10 having the diameter of 510 mm is constructed in the soil layer having rigid property. In order to perform the test with respect to three sets of crossholes, the first to fifth measurement holes 20, 22, 24, 26 and 28 are formed around the granular compaction pile 10 in such a manner that the velocity of the S-wave passing through the surrounding ground can be measured through the first and second measurement holes 20 and 22, the velocity of the S-wave passing through the granular compaction pile 10 and the surrounding ground can be measured through the second and third measurement holes 22 and 24, and the velocity of the S-wave passing through the granular compaction pile 10 can be measured through the fourth and fifth measurement holes 26 and 28.

In addition, since components of the granular compaction pile 10 are free from the chemical cementation or adhesion, the strength of the granular compaction pile 10 is greatly affected by the restraint stress, so the velocity of the S-wave may vary according to the buried depth of the granular compaction pile 10. For this reason, the velocity profile of the S-wave is obtained by assuming the increment of the restraint stress according to the depth of the granular compaction pile 10. In addition, the velocity of the S-wave for the granular compaction pile 10 is actually measured to the depth of 0.8 mm by using the fourth and fifth measurement holes 26 and 28, so the restraint stress influence coefficient ($n_G$: the gradient of S-wave velocity according to effective stress increment in log-log coordinate) is set to 0.28. The velocity of the S-wave measured from the ground surface to the depth of 0.3 mm has a great value of 489-258 m/sec because the grouting material 30 is excessively introduced when drilling work is performed for the crosshole test so that the grouting material 30 causes cementation effect together with the crushed stone. The effective stress restraint is determined based on a unit weight of the crushed stone. The determined restraint stress influence coefficient is applied to Equation 1 together with the S-wave velocity beyond the depth of 0.8 mm as shown in FIG. 4. At this time, $\overline{\sigma}_{m,measured}$ and $V_{s,measured}$ having the value corresponding to the depth of 0.8 m are used.

In addition, in order to measure the S-wave velocity for the surrounding ground of the granular compaction pile 10, the crosshole test is performed in the second and third measurement holes 22 and 24. The forward and the reverse signals (hereinafter, referred to as "bidirectional signals") are overlapped according to the depth and a "butterfly wing" part of the signal is shaded. The shaded part shows the strength distribution of the soft clay layer having the depth of 4 m and lying on the sand layer. The initial S-wave travel time in each depth is determined by using the butterfly wing part of the S-wave signal by overlapping the bidirectional signals. The S-wave velocity profile of the surrounding ground is shown in FIG. 4 together with the S-wave velocity of the crushed stone.

In addition, in order to measure the S-wave travel time between the granular compaction piles 10, the crosshole test is performed in the first and second measurement holes 20 and 22. Below the depth (5.6 m) of the first and second measurement holes 20 and 22, the P-wave passing through pore water arrives prior to the S-wave and then the P-wave is overlapped with the P-wave signal transferred through the crushed stone. Thus, two P-wave signals are overlapped with each other, so it is very difficult to recognize the initial travel time of the P-wave transferred through the crushed stone. In contrast, the travel time of the S-wave can be recognized from the butterfly wing part of the S-wave, which is generated due to the reversal of polarity in the bidirectional signals. Since the polarity of the P-wave, which is primarily arrived by passing through the water, is not changed even if the direction of oscillation is inversed, it may support to determine the travel time of the S-wave. Due to the above property, the S-wave can be preferably used as the seismic wave for measuring the strength of the material existing below underground water without cohesion of particles. The travel time of the S-wave is shown in FIG. 5.

In addition, the diameter (D) of the granular compaction pile 10 is calculated according to Equation 2 by taking the travel distance (L) of the S-wave according to the depth, the travel time ($t_r$) of the S-wave, the S-wave velocity ($V_{CS}$) only for the granular compaction pile 10, and the S-wave velocity ($V_S$) for the surrounding ground.

$$D = \frac{L - V_S \cdot t_r}{V_{CS} - V_S} \cdot V_{CS} \qquad \text{Equation 2}$$

In Equation 2, L represents the distance between the first and second measurement holes 20 and 22 subject to the crosshole test, and $t_r$ represents the travel distance of the S-wave passing through the distance L shown in FIG. 5. In addition, $V_{CS}$ and $V_S$ represent the S-wave velocity for the crushed stone only and the S-wave velocity for the surrounding ground, respectively, as shown in FIG. 4.

The configuration of the stone column is shown in FIG. 6 by calculating the diameter of the granular compaction pile 10 on the assumption that the granular compaction pile 10 has the symmetrical structure. When the depth of the soft clay layer is less than 4 m, the target diameter of the granular compaction pile 10 is slightly larger than 700 mm, and the diameter of the granular compaction pile 10 is slightly smaller than the target diameter below the clay layer (4 m). The volume of the crushed stone calculated based on the measured diameter is about 2.4 m², and the actual volume of the crushed stone is 2.4 m², that is, there is difference in volume of about 10%. This difference may be caused by the crushed stone scattered on the ground during the construction, the density increase of the crushed stone due to compaction, and uncertainty in assumption of the S-wave velocity only for the granular compaction pile 10.

In general, the construction of the granular compaction pile 10 is finished at the N-value 8 to 12. In addition, the greater S-wave velocity is measured and the diameter of the granular compaction pile 10 is slightly small around the depth of 4 m to 5 m, so that the great S-wave velocity is measured for the original ground. This means that the granular compaction pile 10 having the smaller diameter is used in the construction because the original ground is rigid.

In addition, when the construction depth of the granular compaction pile 10 is 6 m, the measurement result for the diameter of the granular compaction pile 10 using the S-wave velocity shows substantially 0, so the measurement method is very suitable for measuring the diameter of the granular compaction pile 10.

In addition, it can be understood from the measurement using the S-wave velocity that the diameter of the granular compaction pile 10 measured according to the depth of the original ground, except for the landfill cover soil, satisfies the desired diameter of the granular compaction pile 10.

As a result, the diameter of the granular compaction pile 10 can be recognized through the crosshole test using the S-wave measurement.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A measurement method for a granular compaction pile using a crosshole seismic test, the measurement method comprising:

a) forming first to fifth measurement holes around the granular compaction pile constructed in a soft ground in such a manner that the first and second measurement holes are aligned in a ground surface at both sides of the granular compaction pile in an x-axis direction of the granular compaction pile, the third measurement hole is aligned in line with an extension line between the first and second measurement holes while being remote from the second measurement hole, and the fourth and fifth measurement holes are aligned in the ground surface at both sides of the granular compaction pile in a y-axis direction of the granular compaction pile perpendicular to the extension line between the first and second measurement holes;

b) injecting a grouting material into the first to fifth measurement holes and inserting casings into the first to fifth measurement holes, respectively; and c) installing an oscillator and a detector of a crosshole seismic tester in the first and second measurement holes, second and third measurement holes, and fourth and fifth measurement holes, respectively, and detecting a velocity of a shearing wave passing through a medium among the first to fifth measurement holes, to measure a diameter of the granular compaction pile according to a construction depth thereof.

2. The measurement method as claimed in claim 1, wherein the first and second measurement holes are formed in the ground surface remote from the granular compaction pile by 10 to 15 cm.

3. The measurement method as claimed in claim 2, wherein the fourth and fifth measurement holes have depth of about 1 m from a ground surface.

4. The measurement method as claimed in claim 1, wherein the fourth and fifth measurement holes have depth of about 1 m from a ground surface.

* * * * *